(12) United States Patent
Hehn et al.

(10) Patent No.: US 12,172,644 B2
(45) Date of Patent: Dec. 24, 2024

(54) METHOD FOR CARRYING OUT A DRIVING MANOEUVRE, CONTROL DEVICE FOR A VEHICLE, AND MOTOR VEHICLE

(71) Applicant: Audi AG, Ingolstadt (DE)

(72) Inventors: Thorsten Hehn, Ingolstadt (DE); Jörg Plechinger, Munich (DE)

(73) Assignee: AUDI AG, Ingolstadt (DE)

( * ) Notice: Subject to any disclaimer, the term of this patent is extended or adjusted under 35 U.S.C. 154(b) by 496 days.

(21) Appl. No.: 17/602,686

(22) PCT Filed: Jan. 17, 2020

(86) PCT No.: PCT/EP2020/051096
§ 371 (c)(1),
(2) Date: Nov. 12, 2021

(87) PCT Pub. No.: WO2020/207631
PCT Pub. Date: Oct. 15, 2020

(65) Prior Publication Data
US 2022/0161800 A1 May 26, 2022

(30) Foreign Application Priority Data
Apr. 9, 2019 (DE) .................... 10 2019 205 034.4

(51) Int. Cl.
*B60W 30/18* (2012.01)
*B60W 40/04* (2006.01)
(Continued)

(52) U.S. Cl.
CPC ...... *B60W 30/18163* (2013.01); *B60W 40/04* (2013.01); *G05D 1/0295* (2013.01);
(Continued)

(58) Field of Classification Search
CPC .......... B60W 30/18163; B60W 40/04; B60W 2554/4041; B60W 2554/4042;
(Continued)

(56) References Cited

U.S. PATENT DOCUMENTS 8,352,111 B2   1/2013  Mudalige
10,089,882 B2  10/2018 Pandy
(Continued)

FOREIGN PATENT DOCUMENTS

AU   2008216988 A1   4/2010
CN   106558225 A     4/2017
(Continued)

OTHER PUBLICATIONS

JP4018236B2_Machine_Translation (Year: 2007).*
(Continued)

*Primary Examiner* — Jelani A Smith
*Assistant Examiner* — Alyssa Rorie
(74) *Attorney, Agent, or Firm* — Sterne, Kessler, Goldstein & Fox P.L.L.C.

(57) ABSTRACT

The invention relates to a method for carrying out a driving maneuver for creating a gap in the traffic flow, which is multiple lanes wide, involving a first vehicle and a plurality of second vehicles. The first vehicle, which requests the gap in the traffic flow periodically sends corresponding request signals at least to a plurality of second vehicles. The second vehicles that intend to comply with the request send out corresponding signaling signals. As soon as a sufficient minimum number of second vehicles that intend to comply with the request can be determined, the second vehicles participating in the driving maneuver for creating the gap in the traffic flow are informed. The second vehicles participating in the driving maneuver agree on the beginning of the driving maneuver and mutually coordinate their trajectories.

(Continued)

One of the second vehicles is designated as the maneuver leader and transmits at least one characteristic of the gap in the traffic flow to the first vehicle.

13 Claims, 2 Drawing Sheets

(51) Int. Cl.
    *G05D 1/00*         (2024.01)
    *G08G 1/00*         (2006.01)
    *G08G 1/16*         (2006.01)
    *H04W 4/46*       (2018.01)

(52) U.S. Cl.
    CPC ............. *G08G 1/162* (2013.01); *G08G 1/166* (2013.01); *G08G 1/167* (2013.01); *G08G 1/22* (2013.01); *H04W 4/46* (2018.02); *B60W 2554/4041* (2020.02); *B60W 2554/4042* (2020.02); *B60W 2554/4049* (2020.02); *B60W 2554/408* (2020.02); *B60W 2556/65* (2020.02)

(58) Field of Classification Search
    CPC ... B60W 2554/4049; B60W 2554/408; B60W 2556/65; B60W 2556/45; G05D 1/0295; G08G 1/162; G08G 1/166; G08G 1/167; G08G 1/22; G08G 1/0965; H04W 4/46
    See application file for complete search history.

(56) References Cited

U.S. PATENT DOCUMENTS

| | | | |
|---|---|---|---|
| 10,108,195 B2 | 10/2018 | Silvlin et al. | |
| 10,386,855 B2 | 8/2019 | Lehmann et al. | |
| 10,733,887 B2 | 8/2020 | Kleen et al. | |
| 10,766,493 B2 | 9/2020 | Buburuzan et al. | |
| 2010/0256852 A1* | 10/2010 | Mudalige | G08G 1/164 |
| | | | 701/24 |
| 2013/0325306 A1* | 12/2013 | Caveney | B60W 30/0953 |
| | | | 701/117 |
| 2017/0291608 A1 | 10/2017 | Engel et al. | |
| 2017/0329337 A1* | 11/2017 | Kusano | G08G 1/0965 |
| 2018/0082590 A1* | 3/2018 | MacNeille | G08G 1/096758 |
| 2018/0244275 A1 | 8/2018 | Bremkens et al. | |
| 2018/0284810 A1* | 10/2018 | Strunck | G08G 1/0965 |
| 2019/0098471 A1 | 3/2019 | Rech et al. | |
| 2020/0137536 A1* | 4/2020 | Nguyen | H04L 27/2607 |
| 2021/0146922 A1 | 5/2021 | Fuchs et al. | |
| 2021/0197826 A1* | 7/2021 | Baum | H04W 4/46 |
| 2022/0375344 A1* | 11/2022 | Yang | B60W 60/001 |

FOREIGN PATENT DOCUMENTS

| | | |
|---|---|---|
| CN | 107031636 A | 8/2017 |
| CN | 109564721 A | 4/2019 |
| DE | 102010013647 A1 | 2/2011 |
| DE | 102011119208 A1 | 5/2013 |
| DE | 102012011994 A1 | 12/2013 |
| DE | 102015221817 A1 | 5/2017 |
| DE | 102016205140 A1 | 5/2017 |
| DE | 102016205142 A1 | 10/2017 |
| DE | 102016205972 A1 | 11/2017 |
| DE | 102016207791 A1 | 11/2017 |
| DE | 102017205230 A1 | 10/2018 |
| DE | 102018109883 A1 | 12/2018 |
| DE | 102017222563 A1 | 6/2019 |
| JP | 4018236 B2 * | 12/2007 |
| WO | WO 2008138353 A1 | 11/2008 |
| WO | WO 2010119182 A1 | 10/2010 |

OTHER PUBLICATIONS

International Search Report and Written Opinion of the International Searching Authority directed to related International Patent Application No. PCT/EP2020/051096, mailed Apr. 29, 2020, with attached English-language translation; 17 pages.

International Preliminary Report on Patentability directed to related International Patent Application No. PCT/EP2020/051096, completed Jul. 7, 2021, with attached English-language translation; 14 pages.

* cited by examiner

METHOD FOR CARRYING OUT A DRIVING MANOEUVRE, CONTROL DEVICE FOR A VEHICLE, AND MOTOR VEHICLE

TECHNICAL FIELD

The present application relates to a method for carrying out a driving maneuver involving a first vehicle and a plurality of second vehicles, wherein the driving maneuver creates a gap in the traffic flow that is multiple lanes wide. The application also relates to a control device for a vehicle and a motor vehicle with at least one communication device for communicating with other motor vehicles.

BACKGROUND

Driving maneuvers that include a plurality of road portions, in particular lanes, are dangerous not only for those who intend to carry out the driving maneuver, but also for vehicles that accidentally come into the vicinity of the vehicle carrying out the driving maneuver. Using the example of crossing a roadway that is multiple lanes wide, it is obvious that the vehicles traveling along the roadway are usually traveling at a recommended speed, while the speed of the crossing party in the longitudinal direction of the roadway is virtually zero. In the event of a collision, it behaves like a collision with a stationary obstacle, with catastrophic consequences.

From DE 10 2010 013 647 A1 a method for controlling a plurality of vehicles is known in order to operate the plurality of vehicles in a column. This includes the following steps within a lead vehicle, which is selected from the plurality of vehicles: Monitoring a particular actual position of each of the plurality of vehicles other than the lead vehicle through vehicle-to-vehicle communication based on data from a particular global positioning device in each of the plurality of vehicles other than the lead vehicle, determining distances for operating the plurality of vehicles in the column based on the particular actual positions of each of the plurality of vehicles, and selecting a particular commanded vehicle position with a particular global positioning coordinate for each of the plurality of vehicles based on the determined distances. Each corresponding commanded vehicle position is transmitted to each of the plurality of vehicles that is not the lead vehicle, and each corresponding one of the plurality of vehicles that is not the lead vehicle is operated based on the particular commanded vehicle position.

BRIEF DESCRIPTION OF THE DRAWINGS/FIGURES

DETAILED DESCRIPTION

Figure 1:
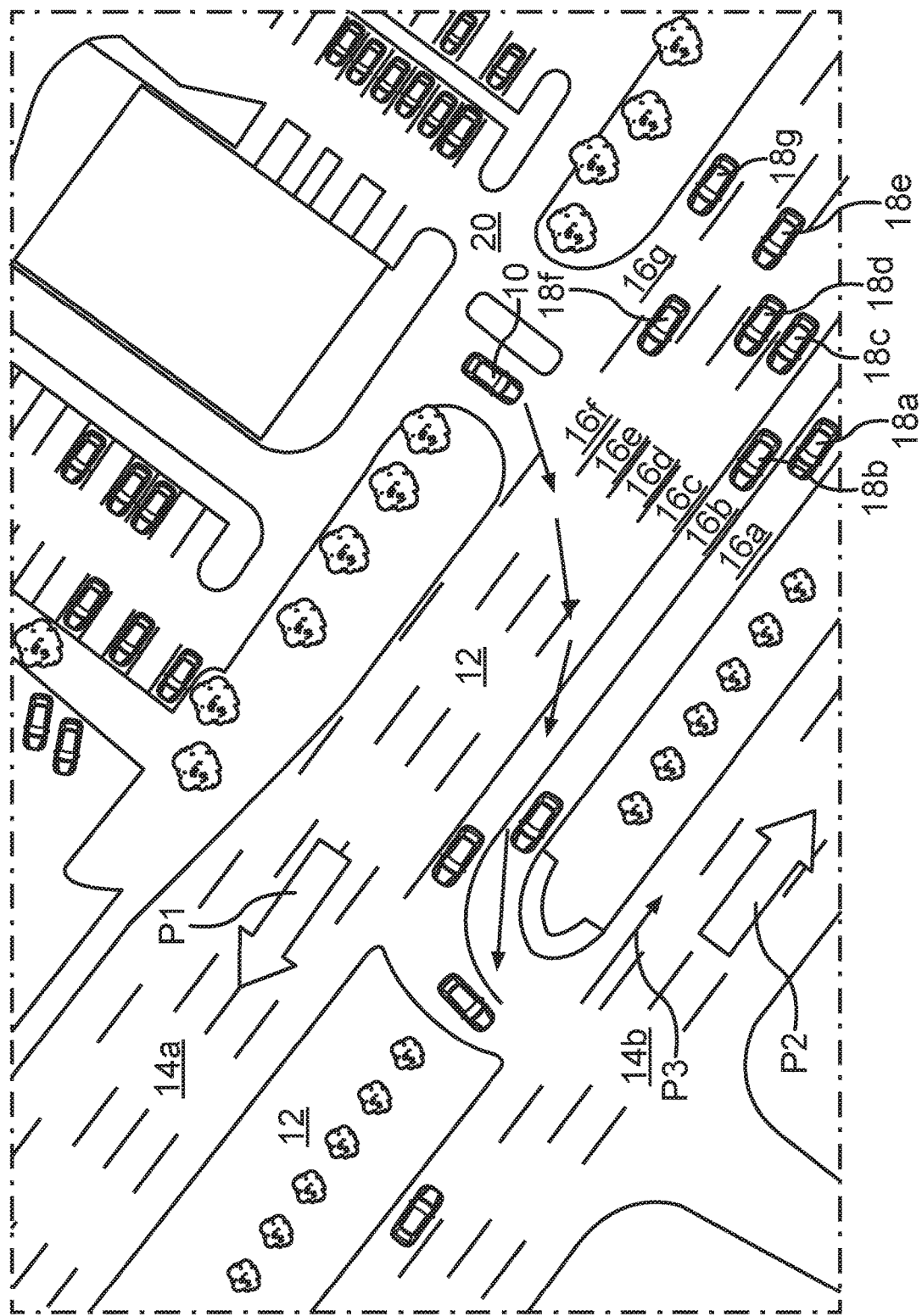
FIG. 1 shows a schematic representation of a situation to illustrate an application for the method, in accordance with some embodiments.

The present application is concerned with driving maneuvers which, in order to be carried out simultaneously or in a short time sequence, require free space in different lanes. This can relate, for example, to the crossing of a multi-lane roadway or maneuvering by means of a truck that impairs the traffic flow in a plurality of lanes when turning or parking. These are situations that are normally dangerous for the traffic involved, on the one hand, and are often associated with long waiting times for users, on the other.

The object of the present invention is therefore to increase traffic safety while carrying out such driving maneuvers.

This object is achieved by the particular features of the independent claims.

The present application is based on the knowledge that V2X (vehicle-to-everything) communication can be used to make such maneuvers safer and more comfortable. Particularly in the case of partially or fully piloted motor vehicles, the appropriate resources are already available to allow the vehicles involved to coordinate carrying out the driving maneuver, be it directly through communication from vehicle to vehicle or else involving communication via infrastructure. If there is initially not a sufficient number of vehicles available that have the appropriate resources, the system waits until a sufficient number has been reached. Because this number of vehicles organize the maneuver amongst themselves, the execution of the maneuver for these vehicles is no longer surprising. Rather, their speed and position are adapted until the driving maneuver can be carried out and further until the driving maneuver can be completed.

Some embodiments for carrying out a driving maneuver involving a first vehicle and a plurality of second vehicles, wherein the driving maneuver creates a gap in the traffic flow that is multiple lanes wide, can include the following steps: In a step a), the first vehicle, which requests the gap in the traffic flow, periodically sends corresponding request signals at least to a plurality of second vehicles located in the traffic flow upstream of the location of the desired gap in the traffic flow. In a step b), these second vehicles receive these request signals, wherein at least the second vehicles that intend to comply with the request send out corresponding signaling signals. In a step c), a check is made as to whether, on the basis of the reception of the signaling signals sent in step b), a sufficient minimum number of second vehicles that intend to comply with the request to cover the multiple lanes of the desired gap in the traffic flow can be determined. If step c) is answered in the affirmative, the second vehicles participating in the driving maneuver for creating the gap in the traffic flow are informed in a step d). In step e), the second vehicles participating in the driving maneuver agree on the beginning of the driving maneuver and mutually coordinate their trajectories. In a step f), one of the second vehicles is designated as the maneuver leader, wherein the maneuver leader communicates with the first vehicle in order to transmit at least one property of the gap in the traffic flow to the first vehicle. Finally, the first vehicle evaluates the at least one characteristic of the gap in the traffic flow transmitted by the maneuver leader in order to use the gap in the traffic flow.

In order to create the gap in the traffic flow, a corresponding number of second vehicles accordingly block a corresponding number of lanes by essentially driving next to one another at low speed or by having come to a standstill. The designation of the steps is not intended to express a strict sequence. For example, the maneuver leader could also be designated earlier.

The designation of the steps is not intended to express a strict sequence. For example, the maneuver leader could also be designated earlier.

In accordance with some embodiments, driving maneuvers that affect a plurality of lanes can be designed more safely and comfortably. The risk of vehicles traveling in one of the affected lanes surprisingly encountering a quasi-stationary obstacle is significantly reduced. Even if not all vehicles traveling on the road are equipped with V2X communication, the present invention contributes to increasing traffic safety. Rather, in the present invention a sufficient number of cooperating vehicles can be sufficient to implement the intended driving maneuver. Because the second vehicles carrying out the maneuver, which are supposed to block the relevant lanes to create the gap in the traffic flow, gradually reduce their speed, wherein the hazard warning lights of the particular second vehicles can be activated during the deceleration to inform the following vehicles, the following traffic can be informed sufficiently early so that these vehicles can also gradually reduce their speed. Distance warning devices are often already installed in vehicles and reliably help to prevent accidents by ensuring that the relative speed between a vehicle in front and a vehicle behind does not exceed a predefinable threshold value, or a predefinable minimum distance is maintained or a warning is issued if a minimum distance is undershot. Because the following traffic does not encounter a quasi stationary obstacle, but rather the second vehicles reduce their speed over a predeterminable distance or a predeterminable period of time, the criteria for the sensible use of a distance warning are met.

In accordance with some embodiments, the request signals are sent in step a) specifically in the direction of the traffic flow upstream of the location of the desired gap in the traffic flow. In this way, the request signals are essentially received by vehicles whose participation in carrying out the driving maneuver is considered. The request signals preferably include location information on the location of the desired gap in traffic flow, i.e. on the one hand the portion in the longitudinal direction of the roadway and on the other hand the lanes involved. Because nowadays, vehicles are usually equipped with a GPS system, the vehicles can determine whether the location of the desired gap in the traffic flow is still ahead of them or whether they have already passed this location. You can also check whether the lane in which you are currently traveling is affected.

In accordance with some embodiments at least one of the following communication methods can be used to send the request signals, to communicate between the first and a second vehicle and to communicate between the second vehicles: C-V2X (Cellular-V2X), NR-V2X (New Radio-V2X), antenna beamforming, short-range communication. C-V2X is a global solution for so-called "vehicle-to-everything communication," which serves to improve vehicle safety, automated driving and traffic efficiency. C-V2X is a V2X communication technology based on the globally recognized specifications of the "3rd Generation Partnership Project" (3GPP). C-V2X is made up of direct communication and network-based communication and supplements the sensors of other driver assistance systems, such as cameras, radar and lidar. The C-V2X direct communication is possible without the involvement of a cellular network or a cellular contract, because the operation is carried out via a specially developed and harmonized 5.9 GHz ITS spectrum.

The term New Radio or 5G NR was coined by 3GPP for Release 15. NR refers to the fifth generation cellular standard, making it the successor to LTE and UMTS.

Preferably, in step d), the vehicles participating in the driving maneuver are informed among one another or by the maneuver leader.

In order to carry out step c), it is preferred if, when the request signal is sent out, data are transmitted from which the number of second vehicles required to carry out the driving maneuver can be determined, for example the number of lanes involved. Because the vehicles can receive and evaluate the signaling signals from the other vehicles among themselves, the second vehicles involved in the implementation of the driving maneuver can determine for themselves whether there is already a sufficient number of second vehicles. In this case, an algorithm can be stored that determines which second vehicles are involved in the driving maneuver in the event that the number of second vehicles that intend to comply with the request is greater than the required minimum number. Because it is preferred that every second vehicle transmits its position on the roadway to the other vehicles, the second vehicles that are closest to the location of the desired gap in the traffic flow can be selected by the algorithm. Methods such as dGNSS or RTK can be used to determine the exact position. The selected vehicles are informed in step d). Alternatively, the maneuver leader can carry out the evaluation and inform the corresponding second vehicles. The second variant is preferred, because this means that uniform information is available for every second vehicle involved.

Furthermore, it is preferred if the vehicle is designated as the maneuver leader which, on the one hand, has received a request signal and, on the other hand, was the first to send out a signaling signal that it intends to comply with the request. Alternatively, the vehicle which, when a sufficient number of second vehicles is reached, is located closest to the location of the desired gap in the traffic flow can be designated as the maneuver leader. This means that the driving maneuver can be coordinated more or less from the front.

The second vehicles preferably exchange data with one another relating to their readiness to participate in the driving maneuver, their particular speed, their particular location and their particular trajectory. In this way, the driving maneuvers to be carried out by the individual second vehicles can be precisely mutually coordinated.

In step f), the point in time at which the gap in the traffic flow will be at the first vehicle is preferably predicted as a property of the gap in the traffic flow. In this way, the first vehicle or the driver of the first vehicle can adjust in good time to use the gap in the traffic flow. Impairment of the rest of the traffic on the roadway can thereby minimized in terms of time.

Furthermore, when a sufficient number of second vehicles has been determined in step c), corresponding information can be sent to the first vehicle and displayed in the first vehicle. In this way, the occupants in the first vehicle can adjust to the fact that the driving maneuver will or should be carried out soon.

The application further relates to a control device for a vehicle which is set up to carry out the steps of a method according to the invention to be carried out by the first and/or a second vehicle, wherein the control device preferably has a processor device. Furthermore, the motor vehicle is equipped with at least one communication device for communicating with other motor vehicles, wherein the motor vehicle also has a control device which is coupled to the at least one communication device.

The application includes further developments of the control device according to the invention and of the motor vehicle according to the invention, which have features as were previously described in conjunction with the further developments of the method according to the invention. For this reason, the corresponding further developments of the method according to the invention are not described again herein.

The motor vehicle according to the invention is preferably designed as a car, in particular as a passenger car or truck or as a passenger bus or motorcycle.

The invention also comprises the combinations of the features of the described embodiments.

The embodiments explained below are preferred embodiments of the invention. In the embodiments, the described components of the embodiments each represent individual features of the invention which are to be considered to be independent of one another and which each further develop the invention independently of one another. Therefore, the disclosure shall also comprise combinations of the features of the embodiments other than the ones presented. Furthermore, the described embodiments may also be supplemented by further features of the invention as already described.

In the figures, the same reference signs refer to functionally identical elements.

The illustration of FIG. 1 shows a road 12 which has two mutually separate directional lanes 14a, 14b. The direction of travel on the directional lane 14a is marked with an arrow P1, the one on the directional lane 14b with an arrow P2.

Directional lane 14a includes lanes 16a to 16g in the illustration. Motor vehicles 18a to 18g are traveling in lanes 16a to 16g.

A motor vehicle 10 would like to leave the parking lot 20 of a strip mall and drive on the street 12 in the direction of the arrow P3. For this purpose, the motor vehicle 10 must implement the maneuvers indicated by further arrows and cross five lanes 16f to 16b in order to turn into lane 16a. If there is a lot of traffic, this is dangerous and requires a long waiting time.

Figure 2:
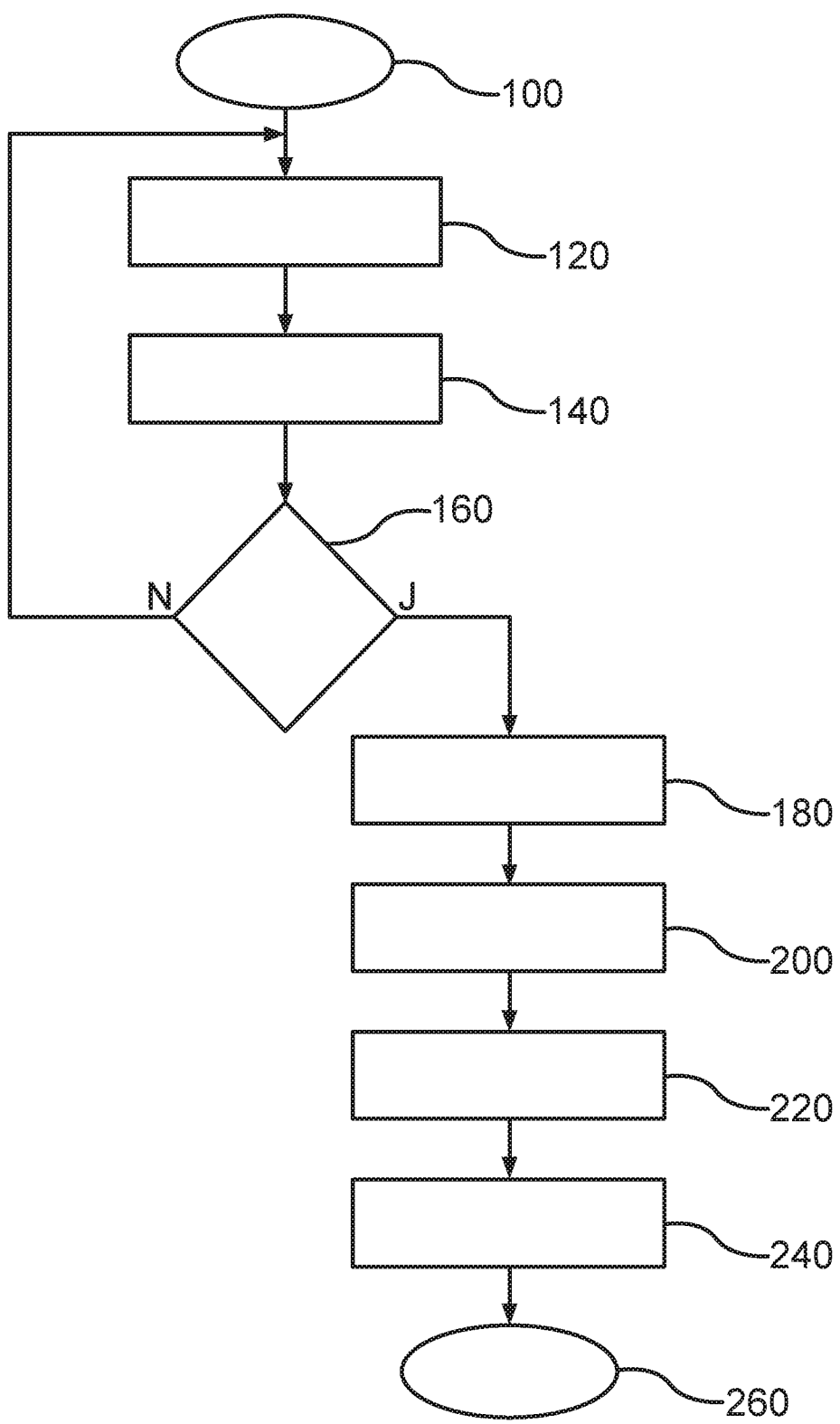
FIG. 2 shows a flow diagram of an embodiment of the method, in accordance with some embodiments.

In order to make these maneuvers safe and comfortable, the method shown in FIG. 2 is carried out. This begins in step 100. In step 120, the vehicle 10, which requests a gap in the traffic flow relating to the lanes 16a to 16f, periodically sends corresponding request signals to the vehicles 18a to 18g located in the traffic flow upstream of the location of the desired gap in the traffic flow. The vehicles 18a to 18g receive these request signals and first check whether the location of the desired gap in the traffic flow is still ahead of them and whether their lane is affected by the desired gap in the traffic flow. The vehicle 18g traveling in the lane 16g is not affected by the driving maneuver for creating a gap in the traffic flow. It continues its travel unhindered.

In the present case, the vehicles 18a to 18f that are affected and that intend to comply with the request send out corresponding signaling signals in step 140. In step 160 a check is made as to whether, on the basis of the reception of the transmitted signaling signals, a minimum number of vehicles that intend to comply with the request can be determined which is sufficient to cover the multiple lanes 16b to 16f of the gap in the traffic flow. If, for example, the vehicle 18d that is traveling in the lane 16d does not intend to comply with the request, the system waits until a vehicle following in the lane 16d signals that it intends to comply with the request. In the case of piloted vehicles in particular, however, a vehicle that has declared its readiness to comply with the request can also be diverted to a lane in which no vehicle has yet declared its readiness to comply with the request. The same applies to the other vehicles or the other lanes.

If it is not yet possible to determine a sufficient minimum number of vehicles, the method branches back to step 120. If, however, a sufficient number of vehicles is determined in step 160, the method branches further to step 180. In step 180, the vehicles participating in the driving maneuver for creating the gap in the traffic flow are informed.

In the subsequent step 200, the second vehicles participating in the driving maneuver agree on the beginning of the driving maneuver and mutually coordinate their trajectories. The trajectories determine which vehicle is reducing its speed in which lane and how, so that the desired gap in traffic flow is created. At the latest in step 220, a vehicle is designated as the maneuver leader, the so-called platoon leader, wherein the maneuver leader takes over communication with the first vehicle in order to transmit at least one property of the gap in the traffic flow to the first vehicle. This is, in particular, a prediction of the point in time at which the gap in the traffic flow will be at vehicle 10.

The vehicle which, on the one hand, received a request signal and, on the other hand, was the first to send out a signaling signal that it intends to comply with the request can be designated as the maneuver leader. Alternatively, the vehicle which, when a sufficient number of second vehicles is reached, is located closest to the location of the desired gap in the traffic flow can be designated as the maneuver leader.

In step 240, the first vehicle evaluates the at least one property of the gap in the traffic flow transmitted by the maneuver leader, for example vehicle 18b, in order to use the gap in the traffic flow. The vehicles creating the gap in the traffic flow form a kind of "vertical" platoon for the duration of the maneuver and carry out their particular maneuvers to create the gap in the traffic flow. After creating the gap in the traffic flow, the vehicle 10 uses the gap in the traffic flow and carries out the driving maneuver marked with arrows while the gap in the traffic flow is present in order to then drive on the directional lane 14b according to the arrow P3. The gap in the traffic flow is then resolved again in that the vehicles involved in the driving maneuver, which formed the gap in the traffic flow, resume their original travel.

The method ends in step 260.

The invention claimed is:

1. A method for carrying out a driving maneuver, comprising:
   requesting, by a first vehicle, a gap in a traffic flow by periodically sending request signals to a plurality of second vehicles located in the traffic flow upstream of a location of a desired gap in the traffic flow;
   receiving, by the first vehicle, corresponding compliance signals from the plurality of second vehicles to confirm readiness to participate in the driving maneuver to create the desired gap;
   determining, based on the reception of the corresponding compliance signals, whether a sufficient number of the plurality of second vehicles to cover multiple lanes needed to create the desired gap have been confirmed, wherein the determining the sufficient number of the plurality of second vehicles to block the multiple lanes results from receiving and evaluating signals amongst the plurality of second vehicles, wherein the the plurality of second vehicles participating in the driving maneuver agree on a beginning of the driving maneuver and mutually coordinate their trajectories, and wherein the second vehicles participate in the driving maneuver by reducing their speed over a predeterminable distance or a predeterminable period of time, so that they travel side by side in their lanes at low speed or come to a standstill to create the desired gap;
   after affirming the sufficient number of the plurality of second vehicles needed to create the desired gap, communicating to the plurality of second vehicles a confirmation for participating in the driving maneuver;

designating, as a maneuver leader, one vehicle amongst the plurality of second vehicles to transmit at least one property of the gap in the traffic flow back to the first vehicle; and evaluating, by the first vehicle, the at least one property of the gap in the traffic flow transmitted by the maneuver leader in order to use the gap in the traffic flow, wherein the desired gap is multiple lanes wide.

2. The method in claim 1, wherein the request signals are sent specifically in a direction of the traffic flow upstream of the location of the desired gap in the traffic flow.

3. The method in claim 1, wherein the communicating to the plurality of second vehicles includes using at least one of: cellular vehicle-to-everything (C-V2X), new radio vehicle-to-everything (NR-V2X), antenna beamforming or short range communication.

4. The method in claim 1, wherein the plurality of second vehicles participating in the driving maneuver are informed between one another or informed by the maneuver leader.

5. The method in claim 1, wherein the designating the maneuver leader comprises:

designating, as the maneuver leader, an earliest vehicle from the plurality of second vehicles to send out a compliance request as an agreement to participate in the driving maneuver.

6. The method in claim 1, wherein the designating the maneuver leader comprises:

designating, as the maneuver leader, a vehicle from the plurality of second vehicles that is closest to the location of the desired gap in the traffic flow.

7. The method in claim 1, wherein the plurality of second vehicles communicating with one another exchange data relating to one or more of their readiness to participate in the driving maneuver, their particular speed, their particular location or their particular trajectory.

8. The method in claim 1, further comprising predicting, as a property of the desired gap, a point in time at which the gap in the traffic flow will be at the first vehicle.

9. The method in claim 1, wherein when a sufficient number of the plurality of second vehicles to participate in the driving maneuver has been determined, corresponding information is displayed in the first vehicle.

10. A control device, comprising:

a processor configured to perform operations comprising:

requesting, by a first vehicle, a gap in a traffic flow by periodically sending request signals to a plurality of second vehicles located in the traffic flow upstream of a location of a desired gap in the traffic flow;

receiving, by the first vehicle, corresponding compliance signals from the plurality of second vehicles to confirm readiness to participate in a driving maneuver to create the desired gap;

determining, based on the reception of the corresponding compliance signals, whether a sufficient number of the plurality of second vehicles to cover multiple lanes needed to create the desired gap have been confirmed, wherein the determining the sufficient number of the plurality of second vehicles to block the multiple lanes results from receiving and evaluating signals amongst the plurality of second vehicles, wherein the the plurality of second vehicles participating in the driving maneuver agree on a beginning of the driving maneuver and mutually coordinate their trajectories, and wherein the plurality of second vehicles participate in the driving maneuver by reducing their speed over a predeterminable distance or a predeterminable period of time, so that they travel side by side in their lanes at low speed or come to a standstill;

after affirming the sufficient number of the plurality of second vehicles needed to create the desired gap, communicating to the plurality of second vehicles a confirmation for participating in the driving maneuver to create the desired gap;

designating, as a maneuver leader, one vehicle amongst the plurality of second vehicles to transmit at least one property of the gap in the traffic flow back to the first vehicle; and evaluating, by the first vehicle, the at least one property of the gap in the traffic flow transmitted by the maneuver leader in order to use the gap in the traffic flow, wherein the desired gap is multiple lanes wide.

11. A motor vehicle, comprising:

at least one communication device for communicating with other vehicles; and a processor, coupled to the at least one communication device, the processor configured to perform operations comprising:

requesting, by a first vehicle, a gap in a traffic flow by periodically sending request signals to a plurality of second vehicles located in the traffic flow upstream of a location of a desired gap in the traffic flow;

receiving, by the first vehicle, corresponding compliance signals from the plurality of second vehicles to confirm readiness to participate in a driving maneuver to create the desired gap;

determining, based on the reception of the corresponding compliance signals, whether a sufficient number of the plurality of second vehicles to cover multiple lanes needed to create the desired gap have been confirmed, wherein the determining the sufficient number of the plurality of second vehicles to block the multiple lanes results from receiving and evaluating signals amongst the plurality of second vehicles, wherein the plurality of second vehicles participating in the driving maneuver agree on a beginning of the driving maneuver and mutually coordinate their trajectories, and wherein the plurality of second vehicles participate in the driving maneuver by reducing their speed over a predeterminable distance or a predeterminable period of time, so that they travel side by side in their lanes at low speed or come to a standstill;

after affirming the sufficient number of the plurality of second vehicles needed to create the desired gap, communicating to the plurality of second vehicles a confirmation for participating in the driving maneuver to create the desired gap;

designating, as a maneuver leader, one vehicle amongst the plurality of second vehicles to transmit at least one property of the gap in the traffic flow back to the first vehicle; and evaluating, by the first vehicle, the at least one property of the gap in the traffic flow transmitted by the maneuver leader in order to use the gap in the traffic flow, wherein the desired gap is multiple lanes wide.

12. The method of claim 1, further comprising communicating to the first vehicle, information conveying that the sufficient number of the plurality of second vehicles needed to create the desired gap has been determined.

13. The method of claim 12, further comprising displaying the conveyed information for occupants inside the first vehicle.

* * * * *